Patented Feb. 11, 1936

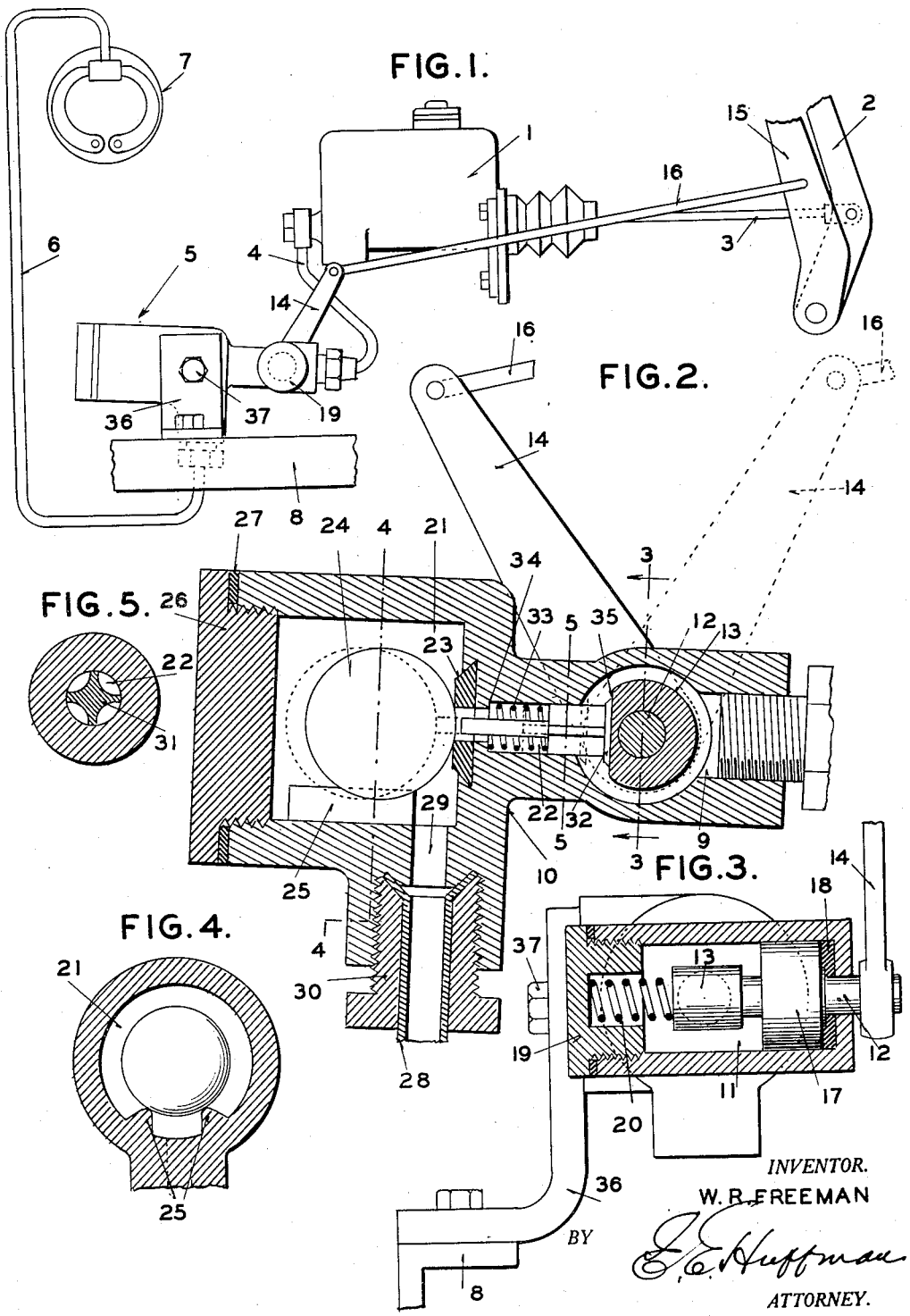

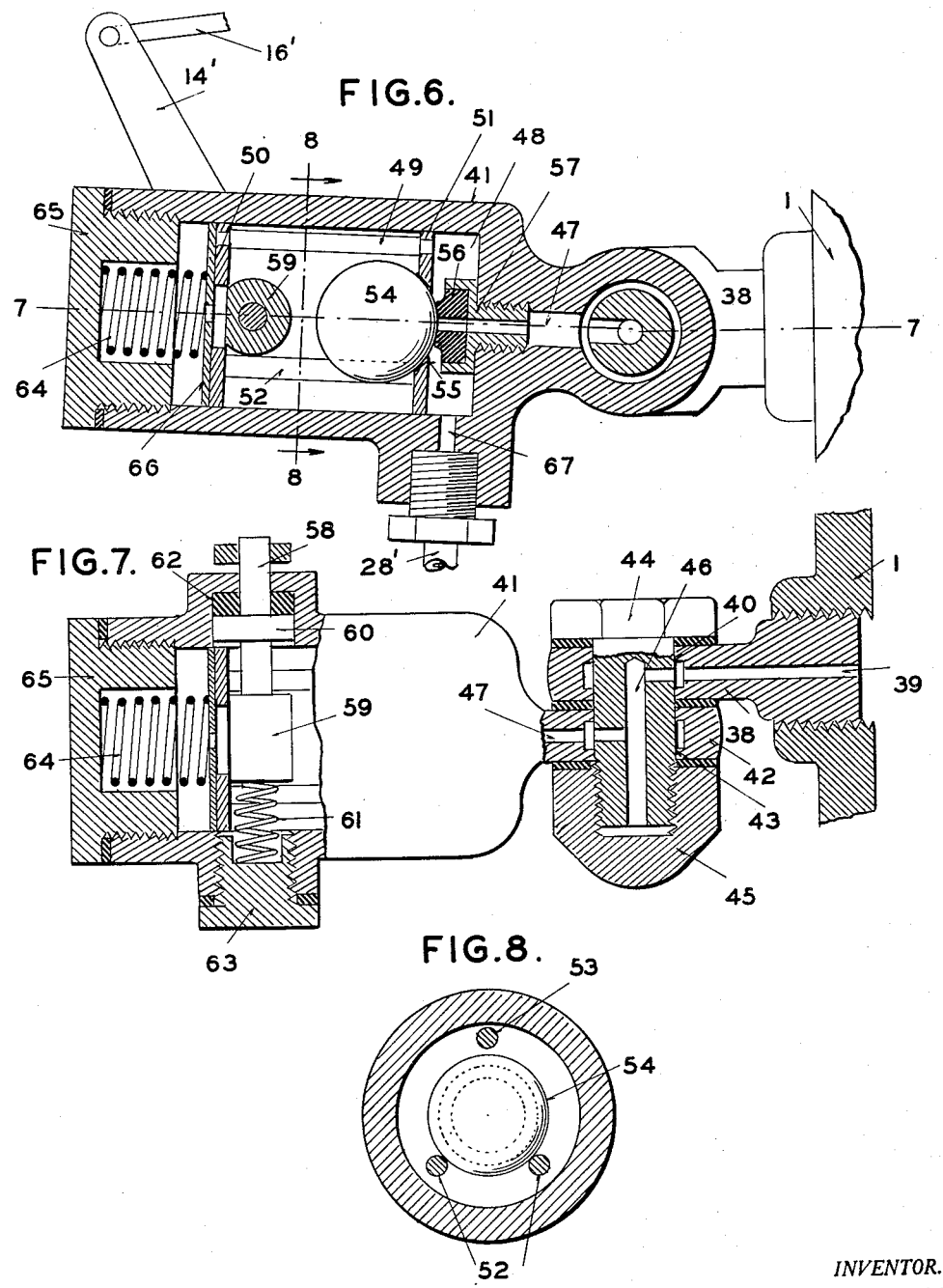

2,030,288

UNITED STATES PATENT OFFICE 2,030,288

BRAKE CONTROL MECHANISM

Walter R. Freeman, St. Louis, Mo., assignor to Wagner Electric Corporation, St. Louis, Mo., a corporation of Delaware Application June 13, 1935, Serial No. 26,377

11 Claims. (Cl. 192—13)

My invention relates to brakes for motor vehicles and more particularly to means for holding the brakes in applied position under certain conditions and independently of the manual brake applying means or its equivalent.

One of the objects of my invention is to provide a braking system with means for preventing release of the brakes, which means is controlled by gravity and deceleration of the vehicle and operable only when the clutch mechanism is in disengaged position.

A more specific object of my invention is to provide a hydraulic brake system with a ball-controlled valve for preventing release of the brakes from applied position, the ball being governed by gravity and deceleration of the vehicle when the clutch mechanism is in clutch disengaged position and maintained in inoperative position when the clutch mechanism is in clutch engaged position.

Other objects of my invention will become apparent from the following description taken in connection with the accompanying drawings illustrating two embodiments thereof. In the drawings Figure 1 is a side view of a hydraulic brake system embodying my invention; Figure 2 is a cross-sectional view of the valve mechanism; Figures 3, 4 and 5 are cross-sectional views of the valve mechanism taken on the lines 3—3, 4—4, and 5—5, respectively, of Figure 2; Figure 6 is a vertical cross-sectional view of a modified construction; Figure 7 is a partial horizontal cross-sectional view of the same construction; and Figure 8 is a cross-sectional view taken on the line 8—8 of Figure 6.

I have disclosed my invention as being applied to a hydraulic brake actuating system but it is to be understood that it can be employed in association with other types of brake actuating apparatus.

Referring to Figures 1 to 5 of the drawings, the master cylinder device 1 for the hydraulic system is of the usual type and embodies a cylinder and piston (not shown) whereby actuation of the brake pedal 2 and the connecting rod 3 will create a fluid pressure in the system to apply the brakes. The outlet of the master cylinder is connected by means of a flexible tube 4 to my novel brake release preventing means 5, which means is also connected with the conducting line 6 leading to the wheel brakes 7 (one only being diagrammatically illustrated).

My novel release preventing means is shown as being mounted on the frame member 8 of a vehicle and since the master cylinder is usually attached to the engine which has relative motion to the frame member, the use of the flexible hose is necessary for this type of installation. The outer end of the flexible hose 4 is secured in fluid-tight relation with the inlet 9 of the casing 10 of the release preventing means. This casing is formed with a cross-bore 11 receiving a rotatable shaft 12 provided with a cam 13. The shaft extends to the exterior of the casing and has secured thereon an arm 14, the outer end of which is connected to the clutch actuating pedal 15 by means of a suitable rod 16.

The shaft 12 has an integral annular shoulder 17 acting as a bearing portion for the shaft. Between this shoulder and the end wall of the bore is a packing member 18 for sealing the opening through which the shaft extends. The opposite end of the bore is provided with a movable plug 19 to permit the shaft and the cam to be removed. A thrust spring 20 interposed between the inner end of the shaft and the plug 19 maintains the shoulder 17 in pressure engagement with the packing.

The casing 10 is so formed as to provide a chamber 21 which is in communication with the bore 11 by a passage 22. The chamber end of this passage is provided with a rubber valve seat 23 for cooperation with a rolling ball 24 forming the movable element of the valve. This ball is adapted to be freely mounted upon a track 25 situated in the base of the chamber 21 and is accessible from the exterior of the casing by means of a plug 26 closing one end of the chamber. Suitable packing means 27 is employed to insure a seal between the plug and the casing. The chamber 21 is in continuous communication with the copper tube 28 leading to the fluid motor of the brakes by means of an outlet passage 29, the tube being in fluid-tight connection with this passage by means of the well-known tubular nut 30 which maintains the flared end of the tube in engagement with the conical seat at the end of the passage.

The passage 22 between the bore 11 and the chamber 21 slidably receives a fluted stem 31, the head 32 of which is biased into engagement with the cam 13 by means of a spring 33 interposed between the fluted portion of the stem and an annular shoulder 34 in the passage. The cam 13 is of cylindrical construction, one side of which, however, being provided with a flat surface 35 which, when in the position shown in Figure 2, permits the end of its stem 31 adjacent the ball to lie within the passage 22. Under these conditions the ball is free to engage the rubber seat 23. When the flat surface 35 of the cam is rotated away from the head of the stem, the stem will be moved to the left, causing the end of the stem to project into chamber 21 and positively maintaining the ball away from its seat.

The means for mounting the release preventing means on the frame member 8 is a bracket 36 to which the casing 10 is clamped by a single stud bolt 37. When unscrewed, this stud will permit the casing to be tilted relative to the vehicle frame. In mounting the release preventing means on bracket 36 it is so positioned that track 25 will be at an angle of approximately three degrees to the plane of the support upon which the vehicle is situated, such angle being suitable to achieve the result that when the vehicle is stopped on either a level or an ascending roadway, the ball 24 will position itself in engagement with the valve seat 23 to close passage 22 (provided stem 31 does not prevent the seating of the valve), and when the vehicle is decelerating, the action of inertia on the ball will be sufficient to maintain it out of engagement with the valve seat. It will be understood, however, that the angle of three degrees may be varied if conditions are such that either a larger or smaller angle is necessary to secure the desired operation of the release preventing device.

In the operation of my device, when the clutch mechanism is in engaged condition the clutch pedal 15 and the arm 14 will be in the position shown in Figure 1 (also in dotted lines in Figure 2). Under these conditions the ball will be positively maintained away from the valve seat since the cam member will be in such a position that the stem 31 will be thrust forward. The brake system will not in any way be affected by the release preventing means and will, therefore, be operable in the usual way, that is, the brakes will be applied when the brake pedal is depressed, and released when the brake applying pressure is relieved from the pedal.

If the clutch mechanism is disengaged by depressing the clutch pedal, the arm 14 will assume the position shown in full lines in Figure 2. Under these conditions the flat cam surface 35 will be presented to the head of the valve stem and the spring 33 will draw the stem into passage 22. The ball is now free to be controlled either by the action of gravity or by the action of inertia during deceleration of the vehicle. If the vehicle is stopped either on a level or on an ascending roadway, gravity will cause the ball to position itself in engagement with seat 23. The brakes, if they have already been applied, will now be maintained in applied position because the ball will prevent the return of fluid under presure from the brakes to the master cylinder. If the brakes have not been applied they may be applied and maintained in applied position by movement of the brake pedal. Fluid under pressure will flow from the master cylinder to the brakes, the fluid pressure unseating the ball. Fluid cannot return to the master cylinder because the ball will seat under the action of gravity as soon as the pressure created by the master cylinder is released. Under these conditions it is not necessary to maintain any braking effort on the brake pedal in order to maintain the brakes applied. The operator's foot, normally used on the brake pedal, may now be employed to operate some other mechanism, as for example, the accelerator pedal. The brakes are released from applied position by the reengagement of the clutch since the clutch pedal, when moved to clutch engaged position, causes the cam 13 to move stem 31 forward, thereby positively holding the ball away from its seat. It is thus seen that the release preventing means is highly effective in assisting the vehicle operator to start the vehicle on an ascending grade without employing the emergency brake in order to hold the vehicle from rolling backward when the foot is positioned on the accelerator to speed up the engine in starting.

When the vehicle is traveling in the forward direction on either a level or a down-grade, it is highly desirable to have the brake release preventing means ineffective and the brakes solely under the control of the brake pedal regardless of whether the clutch mechanism is engaged or disengaged. Under these conditions of vehicle movement, as soon as the brakes are applied the vehicle immediately begins to decelerate. Since the ball 24 may freely roll on track 25, inertia will cause it to move to the left, away from the seat 23. The passage 22 is, therefore, unrestricted, thereby permitting the brakes to be applied and released as desired by the operator.

When the vehicle is stopped on a descending roadway of more than a three degree angle, gravity will maintain the ball in the forward position of the seat. Under these conditions there is no problem present in starting the vehicle as it will roll in the proper direction as soon as the brakes are released and, therefore, the release preventing means is not necessary.

Referring to Figures 6, 7 and 8, I have shown a modification of the release preventing means just described, this modification being adapted to be mounted directly on the master cylinder of the braking system. The outlet of the master cylinder 1 has screw-threaded therein a plug 38 provided with a passage 39 and a cross-opening 40. The casing 41 of the release preventing means has formed integral therewith a projecting portion 42, also provided with an opening 43. These openings are in alignment and receive a bolt 44, whereby the casing 41 may be clamped to the plug 38 by means of an acorn nut 45. The bolt is provided with a suitable passage 46 for placing the passage 39 of the plug in communication with passage 47 leading to the chamber 48 in the casing. The acorn nut seals the bolt passage as shown.

The chamber 48 is in the form of a cylinder in which is reciprocably mounted a cage 49. This cage comprises a pair of end plates 50 and 51 held in spaced relation by two lower rods 52 and an upper rod 53. The two lower rods are so positioned that they form a track upon which is mounted a rolling ball 54. The end plate 51 is formed with a central opening 55 through which may protrude a portion of the ball when the latter is positioned at the right-hand end of the cage. The valve seat 56 with which the ball cooperates, is carried by a removable tubular plug 57 screw-threaded in the end of passage 47.

A rotatable cross-shaft 58 extends across the chamber 48 and is formed with a cam 59 cooperating with the end plate 50 of the cage. This cross-shaft is provided with a shoulder 60 whereby the thrust spring 61 may maintain pressure on the packing 62 to prevent fluid from leaking around the shaft. The shaft and spring may be removed after removal of plug 63. The exterior end of shaft 58 is provided with an arm 14' which is connected to rod 16' leading to the clutch pedal in the same manner as that described with respect to the structure of Figure 1. The cage is normally biased against the cam by means of spring 64 which is interposed between the end closure plug 65 and washer 66 engaging the end plate 50. The copper tube 28' leading to the brakes is connected to outlet passage 67 of the chamber 48.

The casing 41, when mounted on the end of the master cylinder, is so positioned by the clamping bolt 44 that the track comprising the rods 52 will be at an angle of approximately three degrees to the plane of the support of the vehicle in the same manner as the previously described track is positioned.

The modified construction just described operates in identically the same manner as the first described device. When the clutch pedal is in position to disengage the clutch, the parts will be in the position shown and the ball will be governed either by gravity or by inertia during deceleration of the vehicle. When the clutch pedal is in clutch engaged position the cam 29 will be rotated to a position wherein the cage will be moved to the left, thereby positively maintaining the ball away from its seat 56 and preventing the device from having any control over the brakes.

The two devices just described are both simple in construction, efficient in operation, and easily installed in existing hydraulic brake systems. By having the release preventing means comprising only a ball and a seat, which ball is positively moved off its seat by the movement of the clutch pedal to clutch engaged position, there is no danger of the ball remaining stuck or "frozen" on its seat, a condition which may occur when the vehicle is idle in cold weather.

Having fully described my invention, what I claim as new and desire to secure by Letters Patent of the United States is:

1. In a motor vehicle provided with brakes and means for actuating the brakes, means for preventing release of the brakes from applied position, said means comprising a rolling ball which under the action of gravity will assume a position causing said release preventing means to be effective and under the action of inertia during deceleration of the vehicle will assume a position causing said release preventing means to be ineffective, and manually controlled means for positively holding said ball in a position wherein the release preventing means is ineffective.

2. In a motor vehicle provided with brakes, means for actuating the brakes, and clutch mechanism; means for preventing release of the brakes from applied position, said means comprising a rolling ball which under the action of gravity will assume a position causing said release preventing means to be effective and under the action of inertia during deceleration of the vehicle will assume a position causing said release preventing means to be ineffective, and means controlled by the clutch mechanism when it is in clutch engaged position for positively holding said ball in a position wherein the release preventing means is ineffective.

3. In a motor vehicle provided with fluid actuated brakes, valve means comprising a rolling ball for preventing release of the brakes from applied position, said ball being governed by gravity and the deceleration of the vehicle, and manual means for positively holding the ball in a position to cause said valve to be ineffective.

4. In a motor vehicle provided with fluid-actuated brakes, a clutch mechanism, valve means comprising a rolling ball for preventing release of the brakes from applied position, said ball being governed by gravity and the deceleration of the vehicle, and means operable on the ball for causing said valve to be ineffective when the clutch mechanism is in clutch engaged position.

5. In a motor vehicle provided with fluid-actuated brakes, valve means for preventing release of the brakes from applied position, said means comprising a ball adapted to be moved to valve-closed position by the action of gravity and to valve-open position by the action of inertia during deceleration of the vehicle, and manually-controlled means for positively holding said ball in valve-open position.

6. In a motor vehicle provided with fluid-actuated brakes, a clutch mechanism, valve means for preventing release of the brakes from applied position, said means comprising a ball adapted to be moved to valve-closed position by the action of gravity and to valve-open position by the action of inertia during deceleration of the vehicle, and means controlled by the clutch mechanism when it is in clutch engaged position for positively holding said ball in valve-open position.

7. In a motor vehicle provided with fluid-operated brakes comprising a compressor, a brake actuating motor and a conduit therebetween, valve means cooperating with the conduit for preventing release of the brakes from applied position, said valve means comprising a seat, a rolling ball cooperating with the seat to prevent fluid from flowing from the motor to the compressor, said ball being seated by the action of gravity and unseated by the action of inertia during deceleration of the vehicle, and a manually-controlled element for positively holding the ball off the seat.

8. In a motor vehicle provided with a clutch mechanism, fluid-operated brakes comprising a compressor, a brake actuating motor and a conduit therebetween, valve means cooperating with the conduit for preventing release of the brakes from applied position, said valve means comprising a seat, a rolling ball cooperating with the seat to prevent fluid from flowing from the motor to the compressor, said ball being seated by the action of gravity and unseated by the action of inertia during deceleration of the vehicle, and an element operated by the clutch mechanism when in clutch disengaged position for positively holding the ball off the seat.

9. In a motor vehicle provided with clutch mechanism and fluid-operated brakes comprising a compressor, a brake actuating motor and a conduit therebetween, valve means cooperating with the conduit for preventing release of the brakes from applied position, said valve means comprising a seat, a ball cooperating with said seat for preventing fluid from flowing from the motor to the compressor, said ball being mounted on a track positioned at a small angle to the plane of the surface upon which the vehicle operates and movable to a seated position by the action of gravity and to an unseated position by the action of inertia during deceleration of the vehicle, and an element operable by the clutch mechanism when in clutch disengaged position for positively holding the ball off the seat.

10. In a motor vehicle provided with fluid actuated brakes, valve means comprising a rolling ball for preventing release of the brakes from applied position, said ball being governed by gravity and the deceleration of the vehicle, and manual means for positively holding the ball in a position to cause said valve to be ineffective, said last named means including a movable cage having a track upon which the ball is mounted.

11. In a motor vehicle provided with fluid-actuated brakes, a clutch mechanism, valve means comprising a rolling ball for preventing release of the brakes from applied position when the clutch mechanism is in clutch disengaged position, said ball being governed by gravity and the deceleration of the vehicle, and means operable by the clutch mechanism to cause the ball to assume a valve open position when the clutch mechanism assumes clutch engaged position.

WALTER R. FREEMAN.